Aug. 31, 1937.                 J. H. KLESS                 2,091,821
                          SAFETY TWIN STEERING
                          Filed Jan. 24, 1936
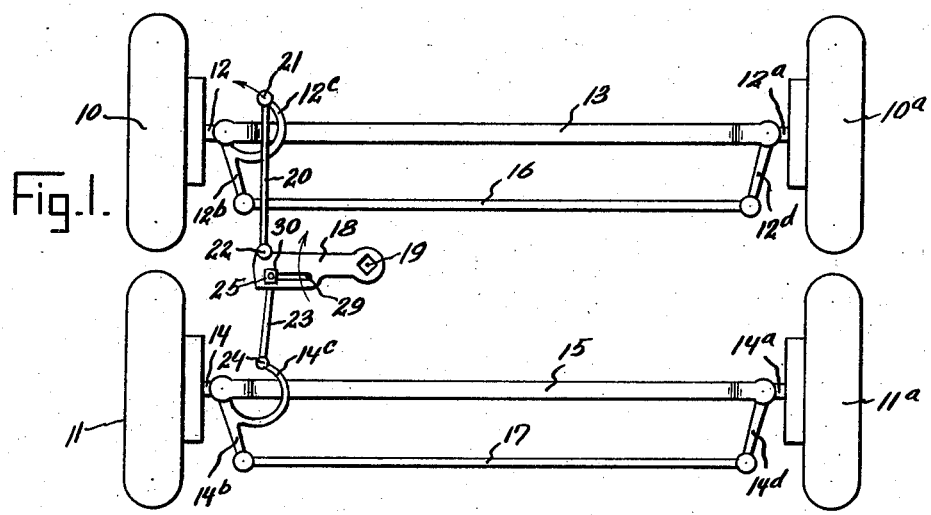
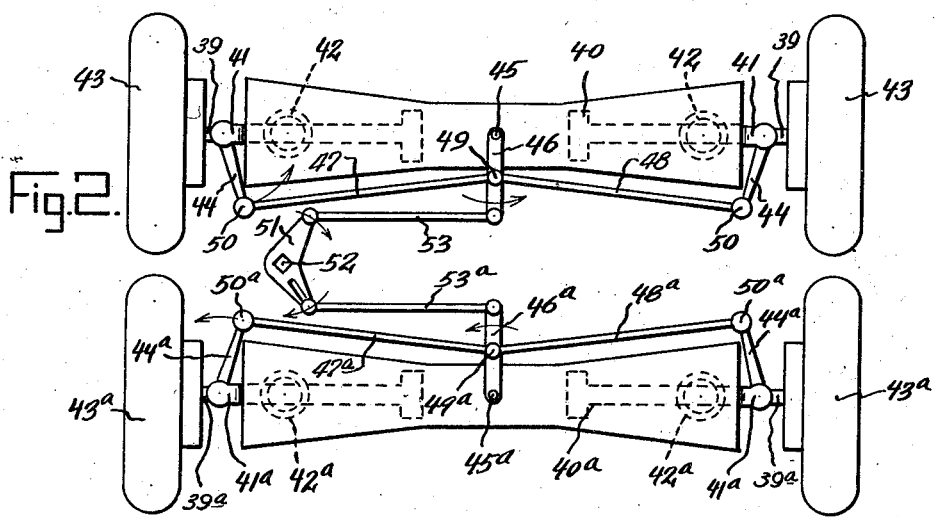
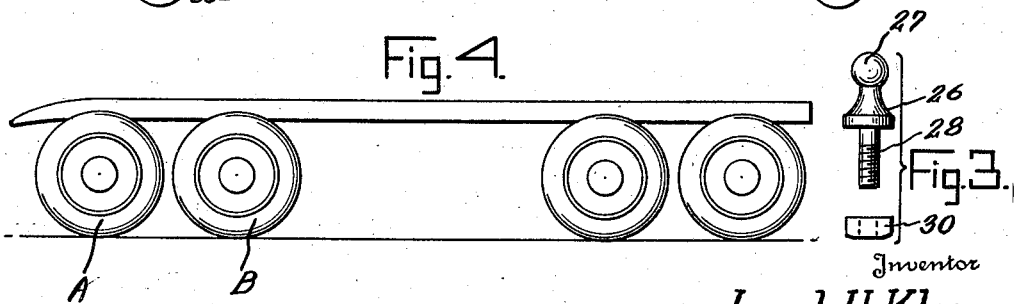
Inventor
Joseph H. Kless
By Carl Miller
Attorney Patented Aug. 31, 1937

2,091,821

UNITED STATES PATENT OFFICE 2,091,821

SAFETY TWIN STEERING

Joseph H. Kless, South Rondout, N. Y.

Application January 24, 1936, Serial No. 60,626

1 Claim. (Cl. 280—91)

This invention relates to a steering mechanism and control particularly adaptable for use with automobiles.

In the conventional forms of automotive vehicles in use there is employed a single pair of wheels at the front of the vehicle so mounted as to permit of steering movement, and which are of such predetermined strength and size as to sustain their portion of the vehicle load. The dangers arising from failure of the steering mechanism to function or from a sudden tire blow out are so well known and appreciated that little can be done to minimize the same other than to insure the perfection of the steering gear and the front tires. It is accordingly the prime purpose of this invention to improve the constructional form of steering wheels and their mounting with the following objects in mind:—

First, to provide at the front of the automotive vehicle a plurality of pairs of steering wheels arranged in tandem;

Secondly, to provide a single steering control interconnecting the steering wheels so as to render all of them simultaneously operative;

Thirdly, to provide by this construction the utilization of smaller tires on the wheels, the reduction of skidding and strain on the tires, the provision of a smaller turning radius of the vehicle, the ability to sustain greater vehicle loads, and an increase in safety as there will be no effect on one pair of steering wheels should there be a blow out or failure of the steering mechanism in the other pair of steering wheels; and Fourthly, the adaptability of this multisteering wheel unit to trucks, busses, trailers, tractors, racing cars and automobiles in general.

These and other objects of the invention will become more apparent as the description thereof given hereunder proceeds with reference to the annexed drawing wherein:—

Figure 1 is a plan view of a tandem steering wheel unit utilizing through axles;

Figure 2 is a plan view of a tandem steering wheel unit wherein each wheel is mounted for independent or the so-called "knee-action" movement;

Figure 3 illustrates an adjustable ball bolt and nut employed in the steering mechanism; and Figure 4 is an elevational view of the chassis and running gear of a vehicle.

Referring to the drawing, in Figure 1 there is shown a tandem steering wheel unit which comprises the front steering wheels 10 and 10ª, and the rear steering wheels 11 and 11ª. Each wheel is rotatably supported on a knuckle or wheel spindle of conventional design, the front wheels 10 and 10ª being carried by the wheel spindles 12 and 12ª pivotally connected for turning movement about a vertical axis, in the manner well known, to the ends of the front through axle 13. In a similar manner the wheel spindles 14 and 14ª, carrying the wheels 11 and 11ª are connected to the ends of the rear through axle 15. The left wheel spindles 12 and 14 are each provided with diverging integral arms 12ᵇ, 12ᶜ and 14ᵇ, 14ᶜ, the right wheel spindles 12ª and 14ª being provided with the arms 12ᵈ and 14ᵈ. The arms 12ᵇ, 12ᵈ and 14ᵇ, 14ᵈ are connected by the tie rods 16 and 17 which are disposed respectively to the rear of the axles 13 and 15 and in parallel relation thereto.

The arms 12ᶜ and 14ᶜ of the spindles 12 and 14 are curved forwardly of the axles 13 and 15, with their free ends in substantial longitudinal alignment. Arranged substantially mid-way between arms 12ᶜ and 14ᶜ is a lever 18 which is connected to the steering gear column mechanism (not shown) for horizontal turning movement about the axis 19. A drag link 20 is pivotally connected at one end to the free end of the arm 12ᶜ as at 21, and at its other end to one side of the lever 18 as at 22. Similarly connecting the other arm 14ᶜ with the lever 18 is a draglink 23, one end of which is pivotally connected as at 24 with the arm 14ᶜ and the other end of which is pivotally connected as at 25 to the lever 18. The pivotal connection 25 comprises a bolt element 26, see Figure 3, provided with a ball head 27 and threaded shank 28 which is placed through a slot 29 formed in the lever 18, the bolt being locked in adjusted position in said slot by the nut 30. This adjustment of the drag link 23 is necessary to accommodate the steering elements in case the distance between the axles 13 and 15 varies as will be obvious because of the attachment of the same to the chassis of the vehicle.

In Figure 2, there is shown a steering control mechanism for a tandem steering wheel unit of the independent or "knee-action" type. The front unit comprises a transverse frame member 40 to which is pivotally connected in the manner well known the half-axles 41 acting against the coil springs 42 suspended between said frame member and axles. This type of independent suspension is utilized in several well known makes of automobiles. The end of each half-axle 41 carries a wheel spindle 39 on which is rotatably mounted the wheels 43, each wheel spindle being provided with a rearwardly directed arm 44. Pivoted centrally as at 45 on the transverse frame member 40 is a lever 46 that extends rearwardly of the same. Tie-rods 47 and 48 connect the lever 46 with the spindle arms 44, the inner ends of the tie-rods being pivoted together about a common pivot 49 to an intermediate portion of the lever 46, the other ends of the tie-rods being pivotally connected as at 50 to the free ends of the arms 44.

The steering mechanism on the rear tandem steering unit carried on the transverse frame member 40ᵃ is identical in all respects with that described above on the front frame member 40 but in reversed and opposed relation thereto as clearly shown in Figure 2, corresponding parts of said steering mechanism having the same reference characters each designated by the letter "a". Arranged between the frame members 40 and 40ᵃ is a bell crank lever 51 connected to the steering gear column mechanism for horizontal turning movement about the axis 52. Pivotally connecting the ends of the bell crank 51 with the free ends of the levers 46 and 46ᵃ are the drag-links 53 and 53ᵃ, the connection of the drag-link 53ᵃ with the bell crank 51 being made adjustable and identical with the adjustable connection of the drag link 23 with the lever 18, in Figure 1. Thus, the half axles 41ᵃ carrying the wheel spindles 39ᵃ are pivotally mounted on the underside of the frame member 40ᵃ to act against the coil springs 42ᵃ. The lever 46ᵃ is pivoted as at 45ᵃ to the frame member 40ᵃ, and the rods 47ᵃ and 48ᵃ pivotally connected at one end as at 50ᵃ to the spindle arms 44ᵃ are connected at their other ends as at 49ᵃ to the lever 46ᵃ.

It is thus apparent that by virtue of the steering mechanism as above set forth that each of the wheels in the tandem steering wheel unit will have simultaneous steering movement.

Figure 4, illustrates a side view of the chassis of a vehicle employing tandem front steering wheels A and B which may be of the form shown either in Figure 1 or Figure 2.

While two preferred forms of steering units have been shown it is to be understood that various changes may be made in the structure thereof within the scope of the appended claim.

Having thus set forth and disclosed the nature of this invention, what is claimed is:

A tandem steering wheel unit comprising longitudinally spaced front and rear pairs of independently mounted wheels, each pair of wheels being rotatably mounted on a wheel spindle supported for steering movement on independently movable arms each pivotally connected to a transverse frame member, an arm on each wheel spindle, the arms on the front and rear wheel spindles being arranged in opposed relation, a lever centrally pivoted at one end to each transverse frame member, a tie rod pivotally connecting each wheel spindle arm with an associated lever, the inner ends of each pair of tie rods being pivoted together about a common axis to an intermediate portion of each said associated lever, a bell crank lever mounted for horizontal turning movement operatively connected to a steering control and arranged between said transverse frame members at the left side thereof, a pair of front and rear drag-links pivotally connected at their inner ends to the free ends of said levers and at their outer ends to the free ends of the bell crank lever arms, the connection of the rear drag link with the associated bell crank lever arm constituting an adjustable bolt and slot universal connection.

JOSEPH H. KLESS.